United States Patent Office 2,744,183
Patented May 1, 1956

2,744,183

INERT GAS-SHIELDED ARC WELDING

Louis A. Conant, Tonawanda, N. Y., assignor to Union Carbide and Carbon Corporation, a corporation of New York No Drawing. Application November 13, 1952, Serial No. 320,358

6 Claims. (Cl. 219—8)

This invention relates to inert gas-shielded arc welding, and more particularly to such welding with a shielding gas consisting of argon and/or helium and a non-consumable, refractory metal electrode composed mainly of tungsten.

In the past such tungsten electrodes have contained a small amount (1%–2%) of thorium as an additive to improve such welding characteristics as contamination losses, open circuit starting voltage, and arc starting losses over commercially pure tungsten electrodes. However, the latter give superior welding performance with respect to operating voltage, melted base area, and weld nugget shape compared to thoriated tungsten electrodes.

The main advantages obtained by adding small amounts of thorium oxide to tungsten are (1) increased resistance of the electrode to contamination by the molten metal being welded, (2) more stable arc operation at relatively low (welding) current, (3) easier arc starting at relativey low voltage, (4) electrode operation at lower temperature, and (5) less work contamination by small particles of the electrode. The major advantage is claimed to be an increase in electrode life by a factor of approximately 10, and is believed to result chiefly from the increased resistance to contamination by molten metal. A disadvantage may lie in the health hazard accompanying the presence of thorium or its oxide in the welding zone.

The main object of this invention is to provide an inert gas-shielded arc welding electrode composed mainly of tungsten and containing a relatively small amount (2%–10%) of several additives which in combination result in unexpectedly superior welding characteristics compared to any single additive including thorium oxide known to the prior art.

Such additives are calcium oxide, yttrium earth concentrate (chiefly yttrium oxide), cerium oxide, and barium oxide. They are added to the tungsten powder in the course of manufacture of the electrodes to yield in the final product from 0.5% to 3% of each of the additives. The additives in the order of effectiveness in laboratory evaluation are calcium oxide, an yttrium earth concentrate (chiefly yttrium oxide), cerium oxide and barium oxide. These additives were introduced into experimental electrodes in concentrations of 2% by weight, with the exception of barium oxide where the concentration was 1%, the balance being tungsten.

The most significant laboratory tests are believed to be (1) extent of electrode contamination by contact with molten metal, (2) minimum open circuit voltage for reliable arc starting using high-frequency gap breakdown, (3) electrode weight loss during repeated arc initiation, (4) arc operating voltage, (5) base metal melting effectiveness, and (6) shape of the weld bead nugget.

Losses of electrode by low melting alloy formation following accidental contact with molten metal are likely to be one of the most important factors in determining electrode life, particularly in hand welding applications. For this reason, measurements were made to determine the ability of various electrodes to withstand contamination by molten stainless steel. A 200 ampere arc was maintained on a stainless steel anode for two minutes; the electrode was then forced into the molten pool of the anode four times in succession (the arc re-establishing itself between immersions) and finally operated for another two-minute period to allow impurities in the electrode to "burn-off." During the entire process the argon flow rate was 25 C. F. H.

The open circuit starting voltage characterizing an electrode under given starting conditions is an important quantity as it determines the open circuit requirement on the welding generator. Electrodes which exhibit a low open circuit voltage requirement for starting will permit a stable arc to be established almost instantaneously, thus minimizing labor and material expenses particularly in machine welding.

Electrode weight loss during starting with high-frequency voltage is significant in connection with spot welding and with repetitive machine welding of small parts or short lengths of seam. Starting loss characteristics were established by determining the weight change produced by many successive arc strikings.

The operating voltage is of interest because it is a measure of power input to the arc. Since most welding comparisons are made on an equal current basis and since in "Heliarc" welding the ratio of power transfer to the work to power input is nearly constant for a wide variety of conditions, the arc voltage is essentially a direct measure of the energy transferred to the work. Accordingly, for many applications a high arc voltage is desirable. On the other hand in welding thin materials burn-through and other undesirable heating effects are to be avoided. One method of doing this is to decrease the arc power by decreasing the arc voltage. Several of the additives of the invention tested produce appreciable lowering of the arc voltage.

Another method of reducing arc power is by reducing the arc current. The extent to which this can be done is determined by the lower current limit for stable operation. This in turn is a function of electrode composition. It has been shown that stable operation can be realized at lower current than that found for standard tungsten rods by using thoriated electrodes. Such a determination has not been made for the electrodes of the invention. However, since it is believed that the starting voltage requirement is an indication of the lower current lmit for stable operation, those electrodes having low starting voltage requirement are expected to operate stably at low arc currents. These are the same electrodes that produce appreciable lowering of the arc voltage so that barium oxide, cerium oxide, and yttrium oxide may be doubly advantageous when used as electrode additive for welding thin materials.

Contrary to results predicted by initial screening tests, all of the experimental electrodes containing additives operated at the normal pure tungsten electrode voltage or less.

Weld beads were made to compare the influence of electrode composition on penetration and the amount of work metal melted. These welds were made at a welding speed of 40 I. P. M. on 0.055 inch thick stainless steel with 150 ampere DCSP arcs. The cold arc length was 0.050 inch and the argon flow rate 20 C. F. H.

The relative position of commercially available pure tungsten and 1% thoria–99% tungsten electrodes in such laboratory tests is compared below with that of experimental electrodes containing the additives of the invention. The most desirable performance is indicated by the first tabulated column with performance deteriorating to the position tabulated in the 6th column.

|  | 1 | 2 | 3 | 4 | 5 | 6 |
|---|---|---|---|---|---|---|
| Contamination Losses | BaO | $Y_2O_3$ | CaO | $ThO_2$ | $CeO_2$ | W |
| Open Circuit Starting Voltage | $Y_2O_3$ | $CeO_2$ | CaO | $ThO_2$ | BaO | W |
| Arc Starting Losses | $Y_2O_3$ | $CeO_2$ | $ThO_2$ | CaO | BaO | W |
| Operating Voltage | W | CaO | $ThO_2$ | $Y_2O_3$ | $CeO_2$ | BaO |
| Melted Base Metal Area | CaO | W | $ThO_2$ | $Y_2O_3$ | $CeO_2$ | BaO |
| Weld Nugget Shape | CaO | W | $ThO_2$ | $Y_2O_3$ | $CeO_2$ | BaO |

Inert gas-shielded arc welding electrodes of tungsten which contain a combination of at least two or more of such four additives, with or without a small amount (1%–2%) of thorium oxide, provide unexpectedly superior performance in such welding over any known to the prior art involving but one additive.

My application Serial No. 318,750, filed November 4, 1952, for "Inert Gas-Shielded Arc Welding," now Patent No. 2,695,946, claims the use of calcium oxide as the additive for refractory metal electrodes for gas-shielded arc welding; and my application Serial No. 318,749, filed November 4, 1952, for "Refractory Metal Electrode Inert Gas-Shielded Arc Welding," now Patent No. 2,695,945, claims the use of yttrium oxide for such purpose. Such patents disclose how the additives of the present invention may be incorporated with the refractory metal in making the new electrodes, and how such electrodes can be tested.

I claim:

1. A refractory metal inert gas-shielded arc welding electrode composed of 1%–10% of additive material which contains at least two oxides selected from the group consisting of barium oxide, calcium oxide, cerium oxide and yttrium oxide, the balance being substantially all tungsten.

2. A refractory metal inert gas-shielded arc welding electrode comprising tungsten in which is incorporated from 0.5% to 3% each of barium oxide, calcium oxide, cerium oxide and yttrium oxide.

3. An electrode as defined by claim 2, which also contains a small amount (1%–2%) of thorium oxide.

4. A gas-shielded arc welding electrode consisting of tungsten containing 0.5% to 3% of at least two additives selected from the class consisting of cerium oxide, yttrium oxide and thorium oxide.

5. An arc welding electrode consisting of tungsten and 0.5% to 3.0% of cerium oxide and yttrium oxide incorporated therewith.

6. An arc electrode composed of tungsten having mixed therein from 0.5 to 3% of finely divided cerium oxide.

References Cited in the file of this patent

UNITED STATES PATENTS

| | | |
|---|---|---|
| 761,379 | Heany | May 31, 1904 |
| 1,569,095 | Laise | Jan. 12, 1926 |
| 1,792,943 | Terry | Feb. 17, 1931 |
| 1,843,244 | Rukop | Feb. 2, 1932 |
| 2,515,559 | Lancaster et al. | July 18, 1950 |
| 2,540,811 | Cobine | Feb. 6, 1951 |